US012718726B2

(12) United States Patent
Kim et al.

(10) Patent No.: US 12,718,726 B2
(45) Date of Patent: Aug. 25, 2026

(54) DISPLAY DRIVING CIRCUIT, DISPLAY DEVICE INCLUDING THE SAME, AND METHOD OF DRIVING DISPLAY DEVICE

(71) Applicant: SAMSUNG DISPLAY CO., LTD., Yongin-si (KR)

(72) Inventors: Hyun Chang Kim, Yongin-si (KR); Se Byung Chae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/304,061

(22) Filed: Aug. 19, 2025

(65) Prior Publication Data

US 2025/0384803 A1 Dec. 18, 2025

Related U.S. Application Data

(63) Continuation of application No. 18/380,905, filed on Oct. 17, 2023, now Pat. No. 12,400,570, which is a continuation of application No. 18/160,265, filed on Jan. 26, 2023, now Pat. No. 11,854,453, which is a continuation of application No. 17/412,609, filed on Aug. 26, 2021, now Pat. No. 11,587,487.

(30) Foreign Application Priority Data

Jan. 8, 2021 (KR) ........................ 10-2021-0002884

(51) Int. Cl.
*G09G 3/20* (2006.01)

(52) U.S. Cl.
CPC ....... *G09G 3/20* (2013.01); *G09G 2310/0267* (2013.01); *G09G 2310/0275* (2013.01); *G09G 2310/08* (2013.01)

(58) Field of Classification Search
CPC ............. G09G 3/20; G09G 2310/0267; G09G 2310/0275; G09G 2310/08
See application file for complete search history.

(56) References Cited

U.S. PATENT DOCUMENTS

| | | | |
|---|---|---|---|
| 8,792,535 | B2 | 7/2014 | Nakadaira |
| 9,466,263 | B2 | 10/2016 | Bae et al. |
| 9,905,193 | B2 | 2/2018 | Oh et al. |
| 10,380,934 | B2 | 8/2019 | Kim et al. |

(Continued)

FOREIGN PATENT DOCUMENTS

| | | | |
|---|---|---|---|
| CN | 103051332 | A | 4/2013 |
| CN | 104347023 | A | 2/2015 |

(Continued)

*Primary Examiner* — Kevin M Nguyen
(74) *Attorney, Agent, or Firm* — CANTOR COLBURN LLP

(57) ABSTRACT

A display driving circuit includes a clock signal generator which generates a clock signal at a frequency in response to a frequency control signal, a frequency variation determiner which adaptively changes a frequency variation of the clock signal, based on a magnitude of a deviation between the frequency of the clock signal and a target frequency calculated based on a reference clock signal supplied from the outside, and a frequency controller which generates the frequency control signal which updates the frequency of the clock signal, based on the frequency variation, and provides the frequency control signal to the clock signal generator.

16 Claims, 9 Drawing Sheets

(56) References Cited

U.S. PATENT DOCUMENTS

| | | | | |
|---|---|---|---|---|
| 10,777,140 | B2 | 9/2020 | Kim et al. | |
| 10,796,661 | B2 | 10/2020 | Park | |
| 12,400,570 | B2 * | 8/2025 | Kim | G09G 3/20 |
| 2017/0169781 | A1 | 6/2017 | Chen et al. | |
| 2017/0169782 | A1 | 6/2017 | Wang et al. | |
| 2017/0243550 | A1 * | 8/2017 | Shepelev | G09G 3/3611 |
| 2017/0262132 | A1 | 9/2017 | Kida et al. | |
| 2017/0301302 | A1 | 10/2017 | Zhao | |
| 2018/0025686 | A1 | 1/2018 | Templin et al. | |
| 2018/0032205 | A1 | 2/2018 | Katsuta | |
| 2018/0047360 | A1 | 2/2018 | Cai et al. | |
| 2018/0076801 | A1 | 3/2018 | Okada | |
| 2018/0197460 | A1 | 7/2018 | Johnson | |
| 2018/0204496 | A1 | 7/2018 | Zhang et al. | |
| 2018/0233105 | A1 | 8/2018 | Cho et al. | |
| 2018/0336957 | A1 | 11/2018 | Mi et al. | |
| 2019/0114968 | A1 | 4/2019 | Kwon | H04N 13/167 |
| 2020/0074958 | A1 | 3/2020 | Park | |
| 2020/0118517 | A1 | 4/2020 | Park | |
| 2020/0410914 | A1 | 12/2020 | Chen | G09G 3/3674 |
| 2020/0410915 | A1 | 12/2020 | Wu | G09G 3/3433 |

FOREIGN PATENT DOCUMENTS

| | | | |
|---|---|---|---|
| CN | 108665840 | A | 10/2018 |
| CN | 111048026 | A | 4/2020 |
| KR | 100616451 | B1 | 8/2006 |
| KR | 1020190140760 | A | 12/2019 |
| KR | 1020200024984 | A | 3/2020 |
| KR | 1020200041406 | A | 4/2020 |
| TW | 201503082 | A | 1/2015 |

* cited by examiner

| FCS | condition (delta range) | FCA |
|---|---|---|
| STEP1 | \|FD\| ≤ DRV1 | FCA1 |
| STEP2 | DRV1 < \|FD\| ≤ DRV2 | FCA2 |
| STEP3 | DRV2 < \|FD\| ≤ DRV3 | FCA3 |
| STEP4 | DRV3 < \|FD\| ≤ DRV4 | FCA4 |
| STEP5 | DRV4 < \|FD\| | FCA5 |

DISPLAY DRIVING CIRCUIT, DISPLAY DEVICE INCLUDING THE SAME, AND METHOD OF DRIVING DISPLAY DEVICE

The application is a continuation of U.S. patent application Ser. No. 18/380,905, filed on Oct. 7, 2023, which is a continuation of U.S. patent application Ser. No. 18/160,265, filed on Jan. 26, 2023, which is a continuation of U.S. patent application Ser. No. 17/412,609, filed on Aug. 26, 2021, which claims priority to Korean patent application 10-2021-0002884, filed on Jan. 8, 2021, and all the benefits accruing therefrom under 35 U.S.C. § 119, the content of which in its entirety is herein incorporated by reference.

BACKGROUND

1. Field

Embodiments of the invention generally relate to a display device, and more particularly, to a display device including a display driving circuit and a method of driving the same.

2. Description of the Related Art

A display device includes a pixel part including pixels for displaying an image and a display driving circuit for controlling driving of the pixel part. The display driving circuit generates a clock signal which is a reference for determining image display of the pixel part and timings of various control signals (e.g., a synchronization signal, a data signal, a scan signal, and the like) used for the display device.

A frequency of the clock signal may be controlled based on a reference clock signal supplied from the outside. The frequency of the clock signal may be adjusted according to driving conditions of the display device, while an image is displayed.

SUMMARY

Embodiments provide a display driving circuit for selecting (or updating) a frequency variation, based on a difference between a frequency of a clock signal and a target frequency, and controlling the frequency of the clock signal to approach the target frequency according to the frequency variation.

Embodiments also provide a display device including the display driving circuit and a method of driving the same.

In accordance with an embodiment of the invention, there is provided a display driving circuit including a clock signal generator which generates a clock signal at a frequency in response to a frequency control signal, a frequency variation determiner which adaptively changes a frequency variation of the clock signal, based on a magnitude of a deviation between the frequency of the clock signal and a target frequency calculated based on a reference clock signal supplied from an outside, and a frequency controller which generates the frequency control signal which updates the frequency of the clock signal, based on the frequency variation, and provides the frequency control signal to the clock signal generator.

In an embodiment, the frequency variation determiner may include a first frequency calculator which calculates a current frequency of the clock signal, based on a value obtained by counting pulses of the clock signal, in a count enable period, a second frequency calculator which calculates a target frequency of the clock signal, based on a value obtained by counting pulses of the reference clock signal, in the count enable period, and a determiner which determines the frequency variation, based on a result obtained by comparing a frequency deviation as a deviation between the current frequency and the target frequency with at least one of predetermined reference deviations.

In an embodiment, a first frequency variation determined when the frequency deviation is equal to or smaller than a first reference deviation may be smaller than a second frequency variation determined when the frequency variation is greater than the first reference deviation and is equal to and smaller than a second reference deviation.

In an embodiment, in an image display mode, the clock signal generator may change the frequency of the clock signal to be close to the target frequency at a predetermined frame interval.

In an embodiment, a variation of the frequency of the clock signal may be stepwisely decreased as a frame elapses until the frequency of the clock signal reaches the target frequency.

In an embodiment, the first frequency calculator may include a first counter which counts the pulses of the clock signal in the count enable period, and a first calculator which calculates a total sum of values supplied from the first counter during the count enable period as a first result corresponding to the current frequency.

In an embodiment, the second frequency calculator may include a second counter which counts the pulses of the reference clock signal in the count enable period, a multiplier which multiplies a value supplied from the second counter by a ratio of a reference frequency to the target frequency, and a second calculator which calculates a total sum of results calculated by the multiplier as a second result corresponding to the target frequency.

In an embodiment, the determiner may compare a difference between the first result and the second result with the at least one of the reference deviations.

In an embodiment, the second frequency calculator may include a second counter which counts the pulses of the reference clock signal in the count enable period, a second calculator which calculates a total sum of values supplied from the second counter during the count enable period, and a multiplier which multiplies a value supplied from the second calculator by a ratio of a reference frequency to the target frequency, and calculates the result calculated by the multiplier as a second result corresponding to the target frequency.

In an embodiment, the frequency controller may provide the frequency control signal to the clock signal generator in a blank period of a predetermined frame.

In an embodiment, the display driving circuit may further include a frequency compensation controller which controls the first frequency calculator and the second frequency calculator and a timing at which the frequency control signal is output, based on a control signal supplied from the outside and the target frequency.

In accordance with another embodiment of the invention, there is provided a method of driving a display device, the method including calculating a first clock number corresponding to a current frequency of a clock signal output from a clock signal generator by counting pulses of the clock signal in a count enable period, calculating a second clock number corresponding to a target frequency of the clock signal by counting pulses of a reference clock signal provided from an outside in the count enable period, comparing a frequency deviation corresponding to a difference between the first clock number and the second clock number with at least one of reference deviations corresponding to predetermined reference clock numbers, determining a frequency variation of the clock signal, based on a comparison result, and updating the frequency of the clock signal in a blank period of a frame, based on the frequency variation, where the frequency variation becomes larger as the frequency deviation becomes larger.

In an embodiment, in the calculating the second clock number, the second clock number may be calculated by multiplying a value obtained by counting the pulses of the reference clock signal by a ratio of a reference frequency to the target frequency. The reference frequency may be a frequency of the reference clock signal.

In an embodiment, a first frequency variation determined when the frequency deviation is equal to or smaller than a first reference deviation may be smaller than a second frequency variation determined when the frequency variation is greater than the first reference deviation and is equal to and smaller than a second reference deviation.

In an embodiment, the frequency of the clock signal may be changed to be close to the target frequency at a predetermined frame interval.

In an embodiment, a variation of the frequency of the clock signal may be stepwisely decreased until the frequency of the clock signal reaches the target frequency.

In accordance with still another embodiment of the invention, there is provided a display device including a pixel part including pixels which display an image, and a display driving circuit which provides the pixel part with data signals corresponding to the image, and outputs a clock signal which controls output timings of the data signals, where the display driving circuit includes a clock signal generator which generates the clock signal at a frequency in response to a frequency control signal, a frequency variation determiner which adaptively changes a frequency variation of the clock signal, based on a magnitude of a deviation between the frequency of the clock signal and a target frequency calculated based on a reference clock signal supplied from an outside, and a frequency controller which generates the frequency control signal which updates the frequency of the clock signal, based on the frequency variation, and provides the frequency control signal to the clock signal generator.

In an embodiment, the frequency variation determiner may include a first frequency calculator which calculates a current frequency of the clock signal, based on a value obtained by counting pulses of the clock signal in a count enable period, a second frequency calculator which calculates a target frequency of the clock signal, based on a value obtained by counting pulses of the reference clock signal in the count enable period, and a determiner which determines the frequency variation, based on a result obtained by comparing a frequency deviation as a deviation between the current frequency and the target frequency with at least one of predetermined reference deviations.

In an embodiment, in an image display mode, the clock signal generator may change the frequency of the clock signal to be close to the target frequency at a predetermined frame interval.

In an embodiment, a variation of the frequency of the clock signal may be stepwisely decreased as a frame elapses until the frequency of the clock signal reaches the target frequency.

BRIEF DESCRIPTION OF THE DRAWINGS

Embodiments will now be described more fully hereinafter with reference to the accompanying drawings.

DETAILED DESCRIPTION

Figure 1:
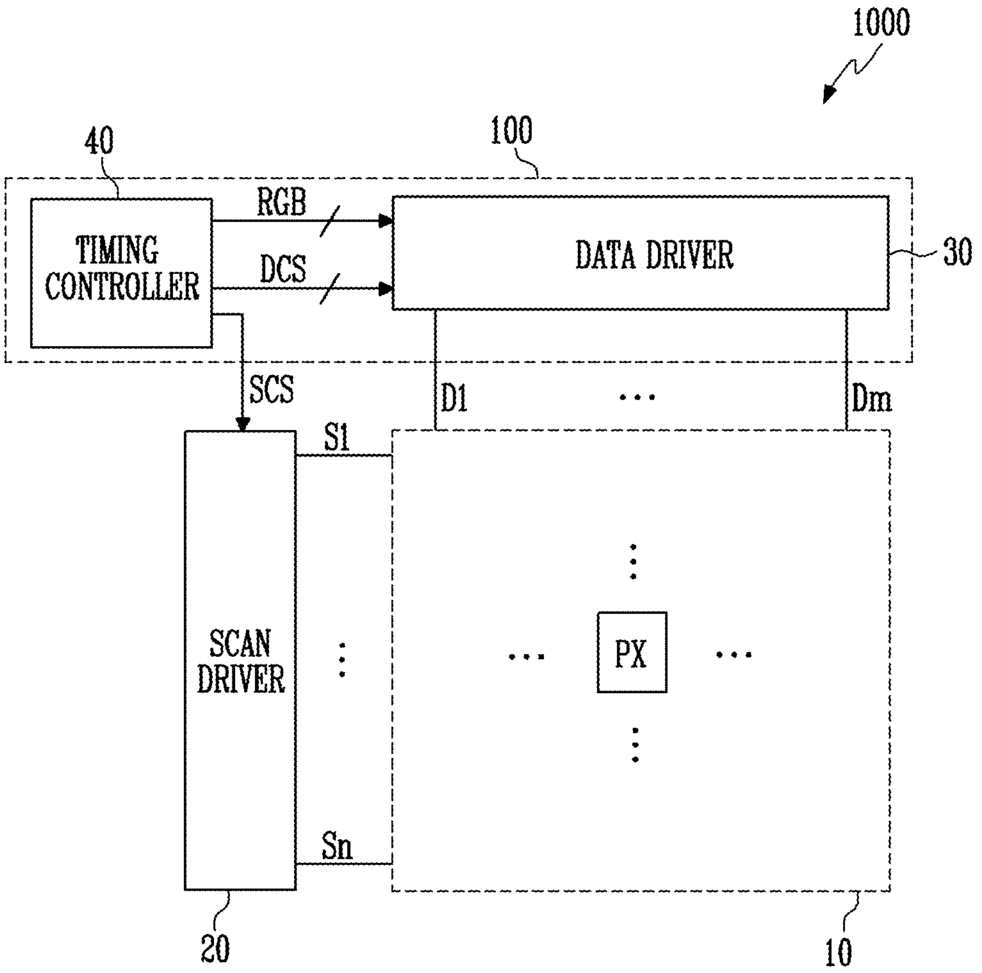
FIG. 1 is a block diagram illustrating an embodiment of a display device in accordance with the invention.

Hereinafter, embodiments of the disclosure will be described in more detail with reference to the accompanying drawings. Throughout the drawings, the same reference numerals are given to the same elements, and any repetitive explanation will be omitted.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating an embodiment of a display device in accordance with the invention.

Referring to FIG. 1, the display device 1000 may include a pixel part 10, a scan driver 20, a data driver 30, and a timing controller 40.

The display device 1000 may be a flat panel display device, a flexible display device, a curved display device, a foldable display device, a bendable display device, or a stretchable display device. Also, the display device 1000 may be applied to a head-mounted display device, a wearable display device, and the like. Also, the display device 1000 may be applied to various electronic devices including a smartphone, a tablet, a smart pad, a television ("TV"), a monitor, and the like.

The display device 1000 may be implemented as a self-luminous display device including a plurality of self-luminous elements. In an embodiment, the display device 1000 may be an organic light emitting display device including organic light emitting elements, a display device including inorganic light emitting elements, or a display device including light emitting elements including a combination of inorganic and organic materials, for example. However, this is merely illustrative, and the display device 1000 may be implemented as a liquid crystal display device, a plasma display device, a quantum dot display device, or the like.

The pixel part 10 may include scan lines S1 to Sn (n is an integer greater than 1), data lines D1 to Dm (m is an integer greater than 1), and pixels PX. The pixels PX may be electrically connected to the data lines D1 to Dm and the scan lines S1 to Sn. In some embodiments, at least one scan line may be connected to each of the pixels PX.

The pixels PX may emit light with a grayscale and a luminance, which correspond to a data signal supplied from the data lines D1 to Dm.

The scan driver 20 may receive a scan control signal SCS supplied from the timing controller 40. The scan driver 20 supplied with the scan control signal SCS may supply a scan signal to the scan lines S1 to Sn. In an embodiment, the scan control signal SCS may include a start signal, scan clock signals, and the like, for example.

The scan driver 20 may be disposed on one area of the pixel part 10 (or one area of a display panel). In an alternative embodiment, the scan driver 20 may be implemented as an integrated circuit ("IC") and be disposed (e.g., mounted) on a flexible circuit board to be connected to the pixel part 10. In an embodiment, the scan driver 20 may be disposed at both sides with the pixel part 10 interposed therebetween.

The data driver 30 may generate a data signal (or data voltage), based on a data control signal DCS and image data RGB, and provide the data signal to the data lines D1 to Dm. The data control signal DCS is a signal for controlling an operation of the data driver 30, and may include a sampling signal, a source output signal, and the like.

The data driver 30 may be implemented as an IC (e.g., a driving IC), and be disposed (e.g., mounted) on a flexible circuit board to be connected to the pixel part 10.

The timing controller 40 may receive input image data from the outside (e.g., a graphic processor). The timing controller 40 may generate the scan control signal SCS and the data control signal DCS, based on a control signal supplied from the outside. Also, the timing controller 40 may rearrange the input image data into an image data RGB corresponding to a pixel arrangement of the pixel part 10, and output the image data RGB.

In an embodiment, a function of at least a portion of the data driver 30 and the timing controller 40 may be integrated as a display driving circuit 100. In an embodiment, the display driving circuit 100 may be provided in the form of an IC for performing all functions of the data driver 30 and the timing controller 40, for example.

The display driving circuit 100 may generate synchronization signals (vertical and horizontal synchronization signals), based on an output signal corresponding to a frame frequency of the display device. A configuration of the display driving circuit 100 which outputs a clock signal will be described in detail with reference to drawings from FIG. 2.

Although n scan lines S1 to Sn are illustrated in FIG. 1, the invention is not limited thereto. In an embodiment, pixels PX disposed on a current horizontal line (or current pixel row) may be additionally connected to a scan line disposed on a previous horizontal line (or previous pixel row) and/or a scan line disposed on a next horizontal line (or next pixel row), corresponding to a circuit structure of the pixels PX. To this end, dummy scan lines (not shown) may be additionally provided in the pixel part 10.

In addition, emission control lines may be additionally connected to the pixels PX, corresponding to the pixel structure of the pixels PX. The display device 1000 may further include an emission driver for driving the emission control lines.

Figure 2:
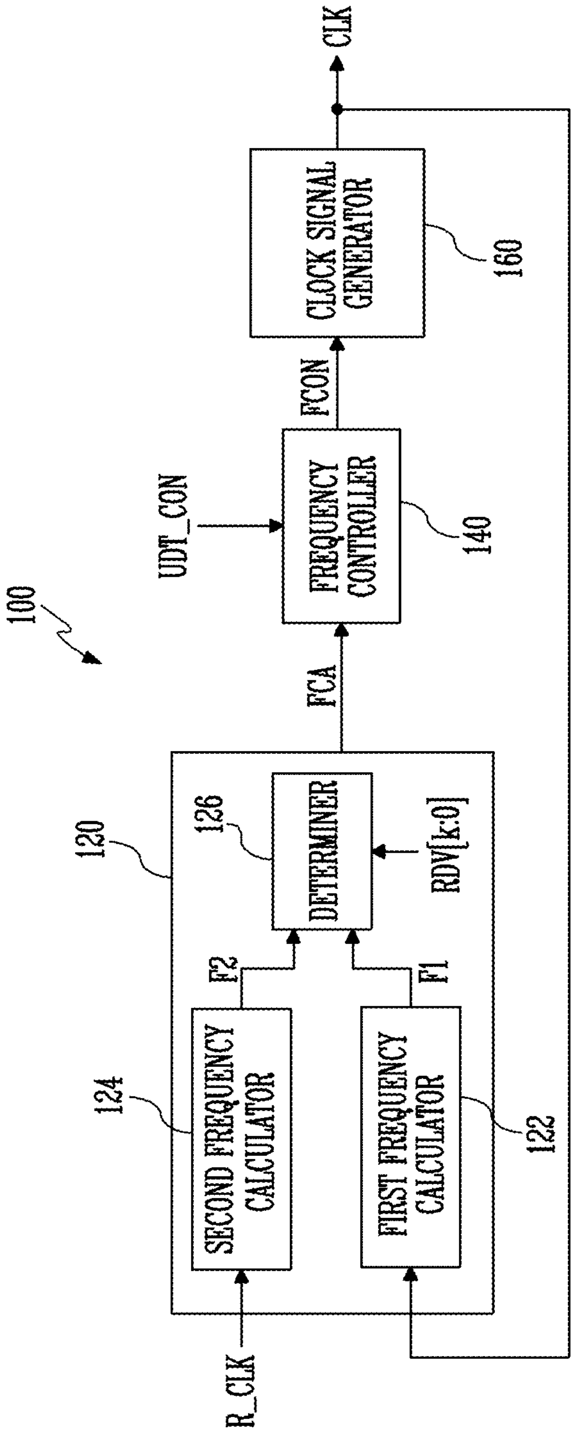
FIG. 2 is a block diagram illustrating an embodiment of a display driving circuit in accordance with the invention.

FIG. 2 is a block diagram illustrating an embodiment of a display driving circuit in accordance with the invention.

Referring to FIG. 2, the display driving circuit 100 included in the display device may include a frequency variation determiner 120, a frequency controller 140, and a clock signal generator 160.

The frequency variation determiner 120 may determine a frequency variation of a clock signal CLK output from the clock signal generator 160, based on a frequency deviation between a reference frequency as a frequency of a reference clock signal R_CLK supplied from the outside and a frequency of the clock signal CLK. In an embodiment, the clock signal CLK may be fed back to the frequency variation determiner 120, and the frequency of the clock signal CLK may be adjusted to reach a target frequency, based on the fed-back clock signal CLK, for example.

In an embodiment, the frequency variation determiner 120 may include a first frequency calculator 122, a second frequency calculator 124, and a determiner 126.

The first frequency calculator 122 may receive the fed-back clock signal. The first frequency calculator 122 may calculate a current frequency F1 of the clock signal CLK, based on a value obtained by counting pulses of the clock signal CLK in a count enable period. In an embodiment, the first frequency calculator 122 may output a number of the pulses of the clock signal CLK counted during the count enable period, for example.

The number of the pulses (e.g., a first clock number) of the clock signal CLK is counted during the count enable period may be understood as the current frequency FI of the clock signal CLK. In some embodiments, the number of the pulses of the clock signal CLK counted during the count enable period may be converted into the current frequency F1 of the clock signal CLK through an additional calculation.

The count enable period may be set as a partial period of one frame. However, this is merely illustrative, and the count enable period is not limited thereto. In an embodiment, the count enable period may be set as a period including a plurality of consecutive frames, for example.

The reference clock signal R_CLK may be supplied from a processor or the like at the outside of the display device 1000. The reference clock signal R_CLK may become a reference for generating the clock signal CLK, and be generated to be robust against external environmental changes. That is, the frequency and voltage level of the reference clock signal R_CLK may be relatively less influenced by a change in ambient temperature, a change in power voltage, etc.

The display driving circuit 100 may generate the clock signal CLK having a high frequency through frequency multiplication of the reference clock signal R_CLK. In general, the reference frequency of the reference clock signal R_CLK and the frequency of the clock signal CLK have a large difference. In an embodiment, the reference frequency may be set as about 32.768 kilohertz (KHz), and the frequency of the clock signal CLK may have a value of about 1 megahertz (MHz) or higher, for example. In an embodiment, the frequency of the clock signal CLK may be determined in a range of about 1 MHz to about 150 MHz according to a driving condition of the display device 1000, for example.

The second frequency calculator 124 may calculate a target frequency F2 of the clock signal CLK, based on the value obtained by counting pulses of the reference clock signal R_CLK in the count enable period. In an embodiment, the second frequency calculator 124 may output a number of the pulses of the reference clock signal R_CLK counted during the count enable period, for example.

As described above, since the reference frequency has a large difference from the frequency of the clock signal and the target frequency F2, the number of the pulses of the reference clock signal R_CLK counted during the count enable period may not correspond to the target frequency F2. Therefore, the second frequency calculator 124 may acquire a count number (e.g., a second clock number) corresponding to the target frequency F2 by multiplying the counted value by a ratio of the reference frequency to the target frequency.

In an embodiment, the value (e.g., the second clock number) obtained by multiplying the number of the pulses of the reference clock signal R_CLK counted during the count enable period by the ratio of the reference frequency to the target frequency may be understood as the target frequency F2, for example. In some embodiments, the value obtained by multiplying the number of the pulses of the reference clock signal R_CLK counted during the count enable period by the ratio of the reference frequency to the target frequency may be converted into the target frequency F2 through an additional calculation.

The determiner 126 may compare a difference (hereinafter, also referred to as a frequency deviation) between the current frequency F1 and the target frequency F2 with at least one of pre-determined reference deviations RDV[k:0](k is a natural number). The determiner 126 may select, as a frequency variation FCA, an output value corresponding to a condition to which the frequency deviation belongs.

In an embodiment, the reference deviations RDV[k:0] may be expressed with k bits, and have different values, for example. In an embodiment, each of the reference deviations RDV[k:0] may be understood as a predetermined delta value, and include information associated with the frequency deviation and/or a clock number corresponding thereto, for example.

In an embodiment, the reference deviations RDV[k:0] may include first to $2^k$th reference deviations, for example. The first reference deviation may have a smallest delta value (or smallest clock number), and the $2^k$th reference deviation may have a largest delta value (or largest clock number). The delta value may increase as approaching the $2^k$th reference deviation. Accordingly, predetermined delta ranges may be defined with respect to the target frequency F2 by the reference deviations RDV[k:0].

In an embodiment, the determiner 126 may determine the frequency variation FCA, based on a delta range to which the frequency deviation belongs. When the frequency deviation is equal to or smaller than the first reference deviation, a first frequency variation may be output as the frequency variation FCA. When the frequency deviation is greater than the first reference deviation and is equal to or smaller than the second reference deviation, a second frequency variation may be output as the frequency variation FCA. The first frequency variation may be smaller than the second frequency variation.

In an embodiment, the frequency variation FCA may be determined as a larger value as the difference between the current frequency F1 and the target frequency F2 becomes larger.

In other words, the determiner 126 may adaptively adjust the frequency variation FCA according to the difference between the current frequency F1 and the target frequency F2. Thus, the time (e.g., a tracking time) desired to tune the output frequency of the clock signal CLK to a level of the target frequency F2 during image display (or in a display mode) may be considerably decreased.

The determiner 126 may include various types of hardware and/or software, which select one from the reference deviations RDV[k:0] by the frequency deviation, and determine an output value corresponding thereto. In an embodiment, the determiner 126 may include a calculation circuit such as comparator, a memory, and the like, for example.

The frequency controller 140 may generate a frequency control signal FCON for updating the frequency of the clock signal CLK, based on the frequency variation FCA. The frequency controller 140 may provide the frequency control signal FCON to the clock signal generator 160 in response to an update control signal UDT_CON.

The frequency of the clock signal CLK may be updated by the update control signal UDT_CON in a predetermined cycle.

The clock signal generator 160 may generate the clock signal CLK at a frequency according to the frequency control signal FCON. The frequency of the clock signal CLK may be higher than the reference frequency. In an embodiment, the clock signal generator 160 may include an oscillator for generating the clock signal.

The clock signal CLK may generally control driving timings of various driving circuits and various logic circuits, which are included in the display device 1000. In an embodiment, the clock signal CLK may determine output timings of a vertical synchronization signal, a horizontal synchronization signal, a data enable signal, and the like, for example.

Figure 3:
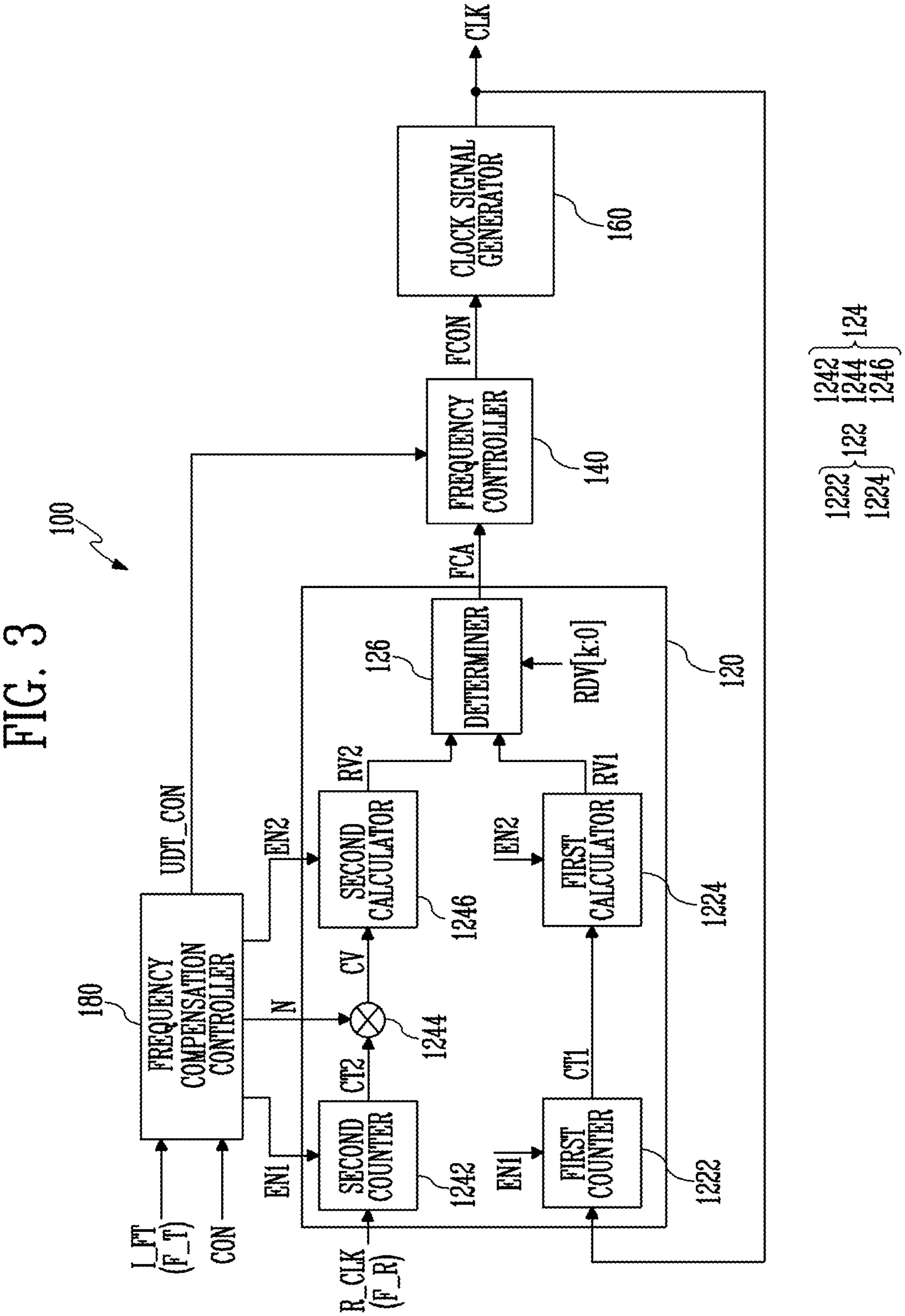
FIG. 3 is a block diagram illustrating an embodiment of the display driving circuit shown in FIG. 2.

FIG. 3 is a block diagram illustrating an embodiment of the display driving circuit shown in FIG. 2.

In FIG. 3, components identical to those described with reference to FIG. 2 are designated by like reference numerals, and any repetitive explanation concerning the above elements will be omitted.

Referring to FIGS. 2 and 3, a display driving circuit 100 may include a frequency variation determiner 120, a frequency controller 140, a clock signal generator 160, and a frequency compensation controller 180.

The frequency compensation controller 180 may receive target frequency information I_FT and a control signal CON.

The target frequency information I_FT may be understood as a target frequency value at which a clock signal CLK is to be output. The frequency compensation controller 180 may calculate, as a frequency coefficient N, a ratio of a reference frequency F_R to a target frequency FT by the target frequency information I_FT. In an embodiment, the frequency coefficient N1 may be determined as a value obtained by dividing the target frequency FT by the reference frequency F_R (i.e., N=F_T/F_R), for example. The frequency coefficient N may be applied to a result (e.g., a clock number) obtained by counting pulses of a reference clock signal R_CLK.

The control signal CON may be a signal for controlling driving of the frequency variation determiner 120 and the frequency controller 140. In an embodiment, the frequency compensation controller 180 may generate a first enable signal EN1, a second enable signal EN2, and an update control signal UDT_CON, based on the control signal CON.

The first enable signal EN1 may control an operation (activation) of a first counter 1222 and a second counter 1242. The second enable signal EN2 may control an operation (activation) of a first calculator 1224 and a second calculator 1246.

The update control signal UDT_CON may control an update time (period) of a frequency of the clock signal CLK. In an embodiment, the frequency of the clock signal CLK may be adjusted in a predetermined frame period, corresponding to a time at which the update control signal UDT_CON is supplied, for example.

As described with reference to FIG. 2, the frequency variation determiner 120 may include a first frequency calculator 122, a second frequency calculator 124, and a determiner 126.

In an embodiment, the first frequency calculator 122 may include the first counter 1222 and the first calculator 1224.

The first counter 1222 may generate a first count value CT1 by counting pulses of the clock signal CLK in a count enable period, based on the first enable signal EN1.

The first calculator 1224 may calculate, as a first result RV1, a first clock number as a total sum of first count values CT1 supplied during the count enable period from the first counter 1222, based on the second enable signal EN2. The first result RV1 (first clock number) may be understood as a value corresponding to the current frequency (F1 shown in FIG. 2) of the clock signal CLK. The first calculator 1224 may include an adder circuit, and the like.

In an embodiment, the second frequency calculator 124 may include the second counter 1242, a multiplier 1244, and the second calculator 1246.

The second counter 1242 may generate a second count value CT2 by counting pulses of the reference clock signal R_CLK in the count enable period, based on the first enable signal EN1.

The multiplier 1244 may multiply the second count value CT2 by the frequency coefficient N. An output CV of the multiplier 1244, which is generated in the count enable period, may be provided to the second calculator 1246.

The second calculator 1246 may calculate, as a second result RV2, a second clock number as a total sum of outputs CV of the multiplier 1244. Since the frequency coefficient N is the value obtained by dividing the target frequency FT by the reference frequency F_R (i.e., N=F_T/F_R), the target frequency FT may be derived from the second result RV2.

In other words, the value (e.g., F2 shown in FIG. 2) derived from the second result RV2 may be understood as a value corresponding to the target frequency F_T. An actual target frequency F_T included in the target frequency information I_FT and the target frequency F2 derived from the second result RV2 based on the counting of the pulses of the reference clock signal R_CLK may not be accurately equal to each other. However, such a deviation is an error which may be neglected in driving of adjusting the frequency of the clock signal CLK.

The determiner 126 may compare a difference between the first result RV1 and the second result RV2 with predetermined reference deviations RDV[k:0]. The determiner 126 may select, as a frequency variation FCA, an output value set in a delta range to which a difference (i.e., a frequency deviation) between the current frequency F1 and the target frequency F2 belongs among delta ranges defined by the reference deviations RDV[k:0].

The frequency controller 140 may provide a frequency control signal FCON to the clock signal generator 160 in response to the update control signal UDT_CON. The clock signal generator 160 may generate the clock signal CLK at a frequency and a timing according to the frequency control signal FCON.

Figure 4:
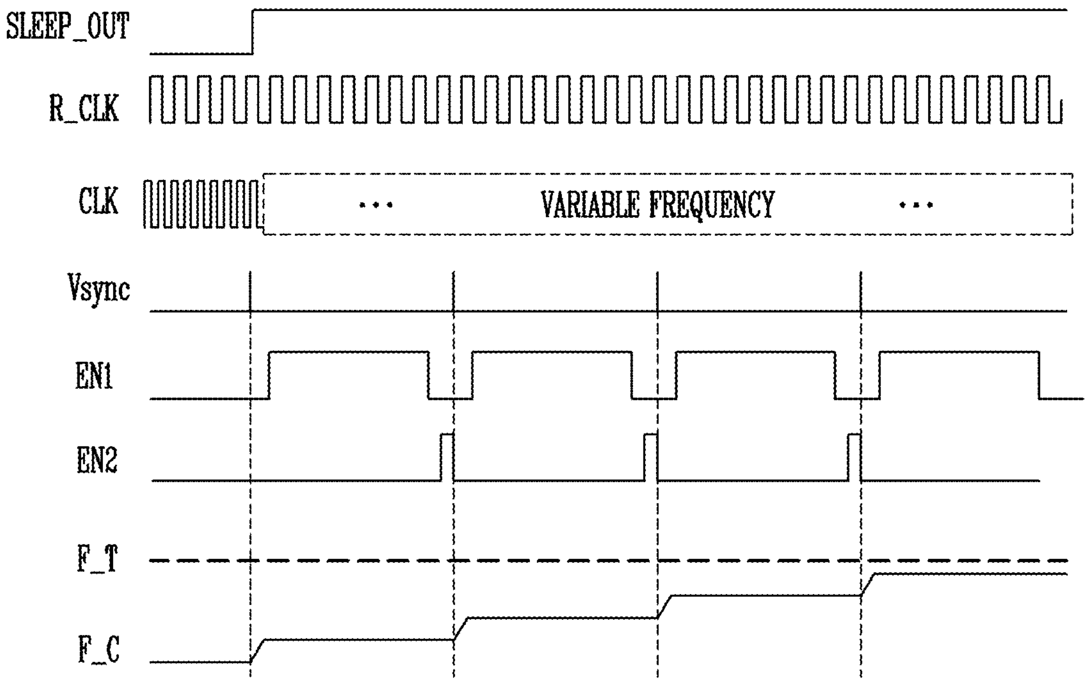
FIG. 4 is a timing diagram illustrating an embodiment of an operation of the display driving circuit shown in FIG. 3.

FIG. 4 is a timing diagram illustrating an embodiment of an operation of the display driving circuit shown in FIG. 3.

Referring to FIGS. 1, 3, and 4, the display driving circuit 100 may rapidly track the frequency (hereinafter, also referred to as a clock frequency F_C) of the clock signal CLK to the target frequency FT in a period in which an image is displayed after sleep-out of the display device 1000.

When an image display operation of the display device 1000 is activated by a sleep-out signal SLEEP_OUT, the clock frequency F_C is accurately adjusted. That is, the display driving circuit 100 may operate in an image display mode in response to the sleep-out signal SLEEP_OUT. In an embodiment, the image display operation of the display device 1000 is activated by a high level of the sleep-out signal SLEEP_OUT, but the invention is not limited thereto, and in another embodiment, the image display operation of the display device 1000 is activated by a low level of the sleep-out signal SLEEP_OUT.

The reference clock signal R_CLK may be supplied to the display driving circuit 100 at a constant frequency of the reference frequency F_R. In an embodiment, the reference frequency F_R may be about 32.768 KHZ, for example.

In the sleep-out of the display device 1000, a vertical synchronization signal Vsync may be output in units of frames. The vertical synchronization signal Vsync may be output (activated) for every blank period of a frame.

The first enable signal EN1 may be activated in a frame period in which an image is displayed. The period in the first enable signal EN1 is activated may be defined as a first period or a count enable period. The first outer 1222 and the second counter 1242 may respectively count pulses of the clock signal CLK and pulses of the reference clock signal R_CLK in response to the first enable signal EN1.

In an embodiment, the second enable signal EN2 may be activated in a second period after the first period. The first calculator 1224 and the second calculator 1246 may respectively calculate total sums (e.g., the first result RV1 and the second result RV2) of values CT1 and CV provided during the first period in response to the second enable signal EN2. The first calculator 1224 and the second calculator 1246 may include a storage such as a memory, which temporarily stores the provided values.

In another embodiment, the second enable signal EN2 may be activated during a period substantially equal to that of the first enable signal EN1. The first calculator 1224 and the second calculator 1246 may respectively accumulate the total sums of the provided values in real time.

In an embodiment, the clock frequency F_C may be changed in a blank period in which the vertical synchronization signal Vsync is supplied. The clock frequency F_C may be adjusted to be close to the target frequency FT in the blank period. In addition, after the blank period, the clock signal CLK may be output at a frequency changed in a previous blank period. That is, the clock frequency F_C is changed in the blank period in which the output of a displayed image is less influenced, so that screen abnormality due to the change in the clock frequency F_C may be minimized.

Figures 5A, 5B:
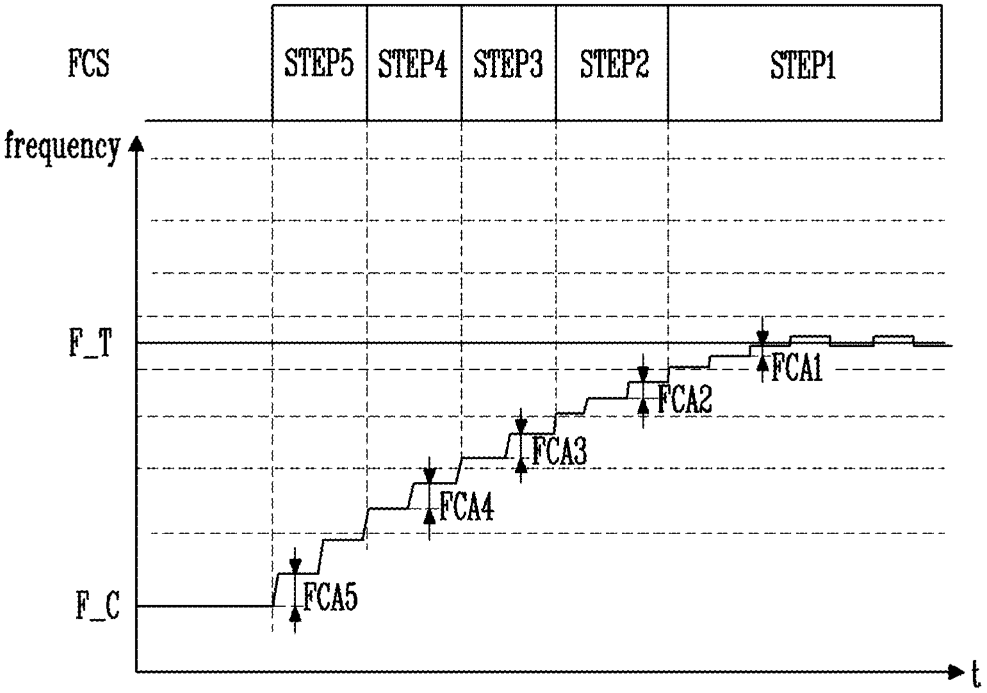
FIG. 5A is a diagram illustrating an embodiment of a change in frequency of a clock signal output from the display driving circuit shown in FIG. 3.
FIG. 5B is a diagram illustrating an embodiment of a relationship of a frequency deviation, a reference frequency, and a frequency variation.

FIG. 5A is a diagram illustrating an embodiment of a change in frequency of a clock signal output from the display driving circuit shown in FIG. 3. FIG. 5B is a diagram illustrating an embodiment of a relationship of a frequency deviation, a reference frequency, and a frequency variation.

Referring to FIGS. 3, 4, 5A, and 5B, the display driving circuit 100 may change the frequency (clock frequency F_C) of the clock signal CLK to be close to the target frequency FT at a predetermined frame interval.

FIGS. 5A and 5B illustrate an example in which first to fourth reference deviations DRV1 to DRV4 for defining five frequency change steps FCS in the display driving circuit and frequency variations VCA1 to VCA5 corresponding thereto. However, this is merely illustrative, and a change form of the clock frequency F_C, a reference deviation, and a frequency variation is not limited thereto.

In an embodiment, the frequency change step FCS may be controlled according to a relationship between the first to fourth reference deviations DRV1 to DRV4 and a frequency deviation FD which may be understood as an absolute value of a difference between the clock frequency F_C and the target frequency FT. In an embodiment, the frequency deviation FD may correspond to a difference value between a clock number corresponding to the target frequency F_T and a clock number corresponding to the clock frequency F_C, and each of the first to fourth reference deviations DRV1 to DRV4 may correspond to a predetermined clock number, for example. However, this is merely illustrative, and each of the frequency deviation FD and the first to fourth reference deviations DRV1 to DRV4 may be calculated as a frequency value converted from a clock number.

The frequency change step FCS may define a magnitude (frequency variation) of a frequency changed at a predetermined frequency change time.

In an embodiment, each of the first to fourth reference deviations DRV1 to DRV4 may be defined as a delta value or predetermined clock number of a frequency. In an embodiment, the second reference deviation DRV2 may be greater than the first reference deviation DRV1 and be smaller than the third reference deviation DRV3, for example. The third reference deviation DRV3 may be smaller than the fourth reference deviation DRV4. Five delta ranges may be defined with respect to the target frequency F_T by the first to fourth reference deviations DRV1 to DRV4. The delta ranges may correspond to first to fifth frequency change steps STEP1 to STEP5. In an embodiment, as shown in FIG. 5B, the frequency change step FCS and a frequency variation FCA corresponding thereto may be determined according to a condition of the delta ranges defined based on the first to fourth reference deviations DRV1 to DRV4, for example.

In addition, the frequency variation FCA may increase according to the frequency change step FCS as the frequency deviation FD becomes larger. In an embodiment, a second frequency variation FCA2 may be greater than a first frequency variation FCA1 and be smaller than a third frequency variation FCA3, for example. A fourth frequency variation FCA4 may be greater than the third frequency variation FCA3 and be smaller than a fifth frequency variation FCA5.

When the frequency variation FD is greater than the fourth reference deviation DRV4, the determiner 126 of the display driving circuit 100 may determine the frequency change step FCS as the fifth frequency change step STEP5, and determine the frequency variation FCA as the fifth frequency variation FCA5. Accordingly, the clock frequency F_C may be changed to be disposed closer by the fifth frequency variation FCA5 to the target frequency FT.

When the frequency deviation FD is greater than the third reference deviation DRV3 and is equal to or smaller than the fourth reference deviation DRV4, the display driving circuit 100 may change the clock frequency F_C through the fourth frequency change step STEP4. The clock frequency F_C may be changed to be close by the fourth frequency variation FCA4 to the target frequency F_T.

When the frequency deviation FD is greater than the second reference deviation DRV2 and is equal to or smaller than the third reference deviation DRV3, the display driving circuit 100 may change the clock frequency F_C through the third frequency change step STEP3. The clock frequency F_C may be changed to be close by the third frequency variation FCA3 to the target frequency FT.

When the frequency deviation FD is greater than the first reference deviation DRV1 and is equal to or smaller than the second reference deviation DRV2, the display driving circuit 100 may change the clock frequency F_C through the second frequency change step STEP2. The clock frequency F_C may be changed to be close by the second frequency variation FCA2 to the target frequency F_T.

When the frequency deviation FD is equal to or smaller than the first reference deviation DRV1, the display driving circuit 100 may change the clock frequency F_C through the first frequency change step STEP1. The clock frequency F_C may be changed to be close by the first frequency variation FCA1 to the target frequency F_T.

As described above, the adjustment (tracking of the clock) frequency F_C may be performed through one of the first to fifth frequency change steps STEP1 to STEP5 according to a magnitude of the frequency deviation FD.

In an embodiment, as shown in FIG. 5A, the frequency variation FCA of the clock frequency F_C may be stepwisely decreased toward the target frequency FT as a frame elapses.

Finally, the clock frequency F_C may be determined as a value equal or similar to the target frequency F_T according to the first frequency variation FCA1.

In an embodiment, the first to fifth frequency variations FCA1 to FCA5 and/or the first to fourth reference deviations DRV1 to DRV4 may be changed according to a frequency deviation FD firstly calculated in the display mode. The firstly calculated frequency deviation FD may be understood as a difference between the target frequency F_T and a current frequency F_C firstly detected in the display mode.

In an embodiment, a frequency variation set according to the fifth frequency variation FCA5 having a maximum frequency variation may increase as the firstly calculated frequency deviation FD becomes larger, for example. The other frequency variations (e.g., FCA1 to FCA4) may be changed corresponding to a change in the maximum frequency variation.

A relationship between the firstly calculated frequency deviation FD and the maximum frequency variation may be set as a linear relationship or an exponential relationship.

In an embodiment, a number of frequency change steps FCS set according to the firstly calculated frequency deviation FD and frequency variations corresponding thereto may be changed. In an embodiment, frequency change steps FCS set according to the firstly calculated frequency deviation FD may be decreased as the firstly calculated frequency deviation FD becomes smaller, for example.

However, this is merely illustrative, and the values and number of the frequency change step FCS, the frequency variation FCA, the reference deviation, and the like are not limited thereto.

The clock signal generator 160 including the oscillator may be influenced by an environmental factor such as a change in ambient temperature or a change in power voltage. The frequency of the clock signal CLK output from the clock signal generator 160 may be changed. In an embodiment, the frequency of the clock signal CLK may be changed due to heat generated when the display device 1000 is used for a long time, for example.

As shown in FIGS. 4 and 5A, the display driving circuit 100 may continuously check the frequency (i.e., the clock frequency F_C) of the clock signal CLK fed back in the display mode. Therefore, although the clock frequency F_C deviates from the target frequency F_T due to the environmental factor, the clock frequency F_C may be automatically and rapidly corrected to the target frequency FT by the frequency change step FCS. In addition, a configuration for detecting a change in environmental factor (i.e., a change in temperature, a change in voltage level associated with clock signal generation, etc.) and a configuration of separate hardware and software for setting an offset value for frequency correction, based on the detected result, may be removed (or omitted).

As described above, in the display driving circuit 100 and the display device 1000 including the same in the embodiments of the invention, the frequency variation FCA may be adaptively adjusted according to the deviation (i.e., the frequency deviation FD) between the current clock frequency F_C and the target frequency F_T. Thus, the time (e.g., the tracking time) desired to tune the clock frequency F_C to a level of the target frequency FT during image display (i.e., in the display mode) may be considerably decreased. Accordingly, screen abnormality (luminance change, crosstalk, flicker, etc.) due to a change in the clock frequency F_C during the image display may be reduced or minimized.

Figure 6:
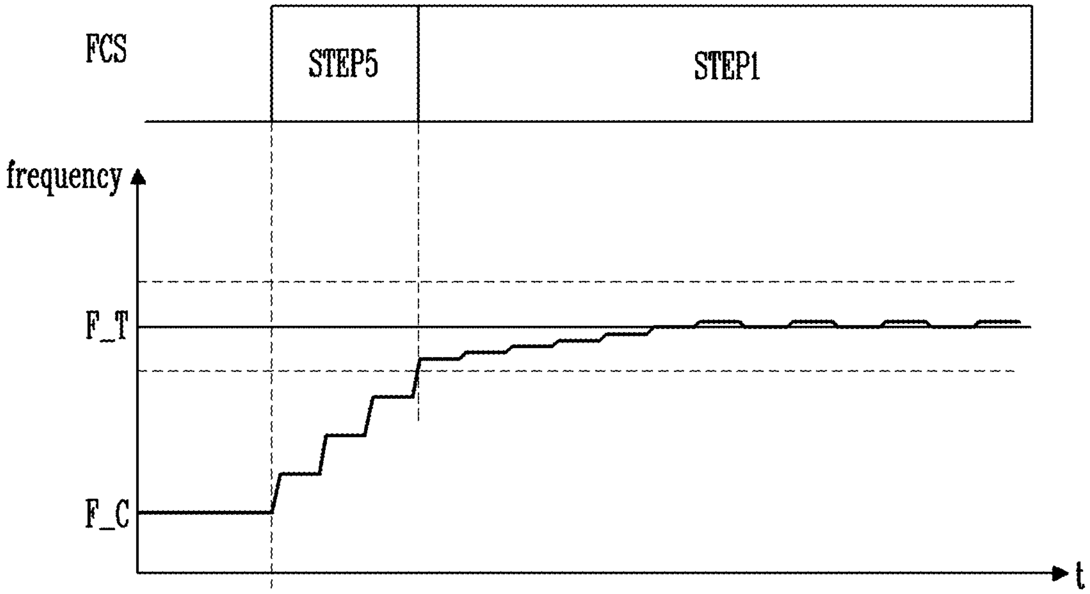
FIG. 6 is a diagram illustrating another embodiment of the change in frequency of the clock signal output from the display driving circuit shown in FIG. 3.

FIG. 6 is a diagram illustrating another embodiment of the change in frequency of the clock signal output from the display driving circuit shown in FIG. 3.

In FIG. 6, components identical to those described with reference to FIGS. 5A and 5B are designated by like reference numerals, and any repetitive explanation concerning the above elements will be omitted.

Referring to FIGS. 3, 4, and 6, the display driving circuit 100 may change the frequency (clock frequency F_C) of the clock signal CLK to be close to the target frequency FT at a predetermined frame interval.

Unlike the embodiment shown in FIG. 5A, in the driving shown in FIG. 6, the clock frequency F_C may be stepwisely changed toward the target frequency FT through two frequency change steps (e.g., the first frequency change step STEP1 and the fifth frequency change step STEP5).

As described above, the display driving circuit 100 may stabilize the clock frequency F_C through an optimum path by various types of frequency change steps according to a design.

Figure 7:
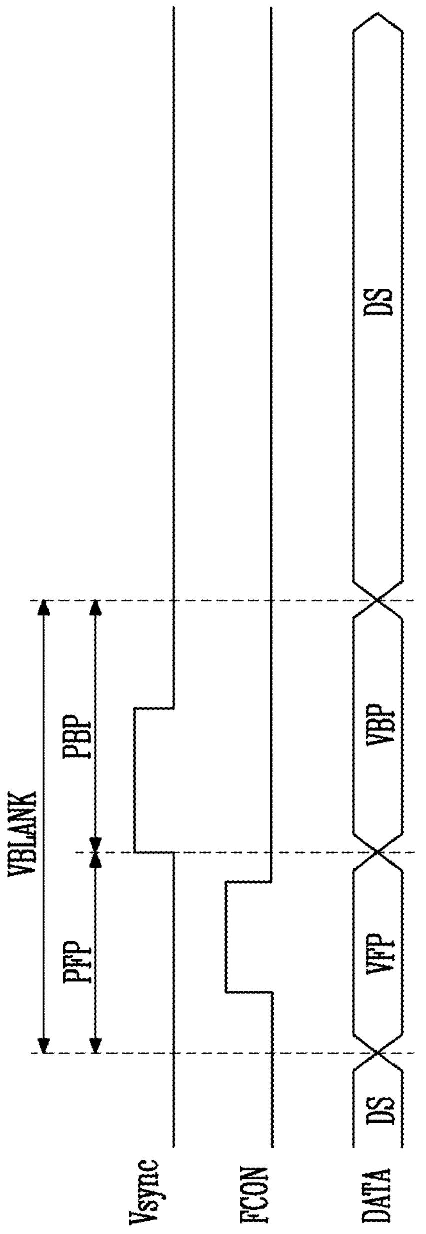
FIG. 7 is a timing diagram illustrating an embodiment of an operation of the display driving circuit shown in FIG. 3 in a blank period.
Figure 8:
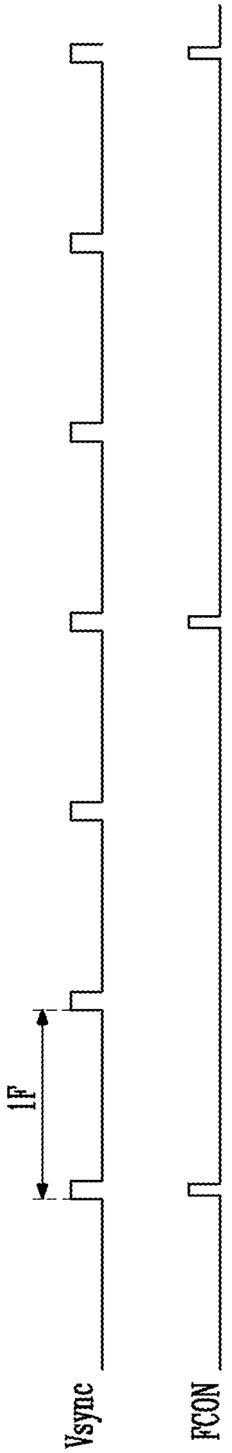
FIG. 8 is a timing diagram illustrating an embodiment of a cycle in which the display driving circuit shown in FIG. 3 changes the frequency of the clock signal.

FIG. 7 is a timing diagram illustrating an embodiment of an operation of the display driving circuit shown in FIG. 3 in a blank period. FIG. 8 is a timing diagram illustrating an embodiment of a cycle in which the display driving circuit shown in FIG. 3 changes the frequency of the clock signal.

Referring to FIGS. 1, 3, 4, 7, and 8, the clock signal generator 160 may change the frequency of the clock signal CLK in response to the frequency control signal FCON.

Each blank period VBLANK may be a vertical blank period between adjacent source output periods in which data signals DS of each frame are output.

The blank period VBLANK may include a period in which the vertical synchronization signal Vsync is supplied, and further include a predetermined period before/after the vertical synchronization signal Vsync is supplied. In an embodiment, the blank period VBLANK may include a front porch period PFP and a back porch period PBP, which are consecutively disposed between the source output periods, for example. In some embodiments, the front porch period PFP may be immediately subsequent a source output period of each frame, and the back porch period PBP may be immediately prior to a source output period of a subsequent frame. The vertical synchronization signal Vsync may be supplied in the back porch period PBP.

In an embodiment, the data driver 30 may output a predetermined front porch voltage VFP during the front porch period PFP, and output a predetermined back porch voltage VBP during the back porch period PBP. The front porch voltage VFP and the back porch voltage VBP may correspond to a black grayscale voltage, but the invention is not limited thereto.

In an embodiment, the frequency control signal FCON may be supplied to the clock signal generator 160 in the front porch period PFP. Therefore, the clock signal generator 160 may change the frequency of the clock signal CLK in the front porch period PFP. However, this is merely illustrative, and the period in which the frequency control signal FCON is supplied is not limited thereto.

In an embodiment, the frequency control signal FCON may be supplied throughout the front porch period PFP and the back porch period PBP, for example. That is, the frequency of the clock signal CLK may be changed in the blank period VBLANK.

In an embodiment, as shown in FIG. 8, the vertical synchronization signal Vsync may be supplied for every one frame IF, and the frequency control signal FCON may be supplied at an interval of three frames. Therefore, the frequency of the clock signal CLK may be changed at the interval of three frames. In addition, the frequency control signal FCON may be supplied to overlap with at least a portion of the vertical synchronization signal Vsync.

As described above, the cycle in which the frequency of the clock signal CLK is changed may be variously set according to a condition.

Figure 9:
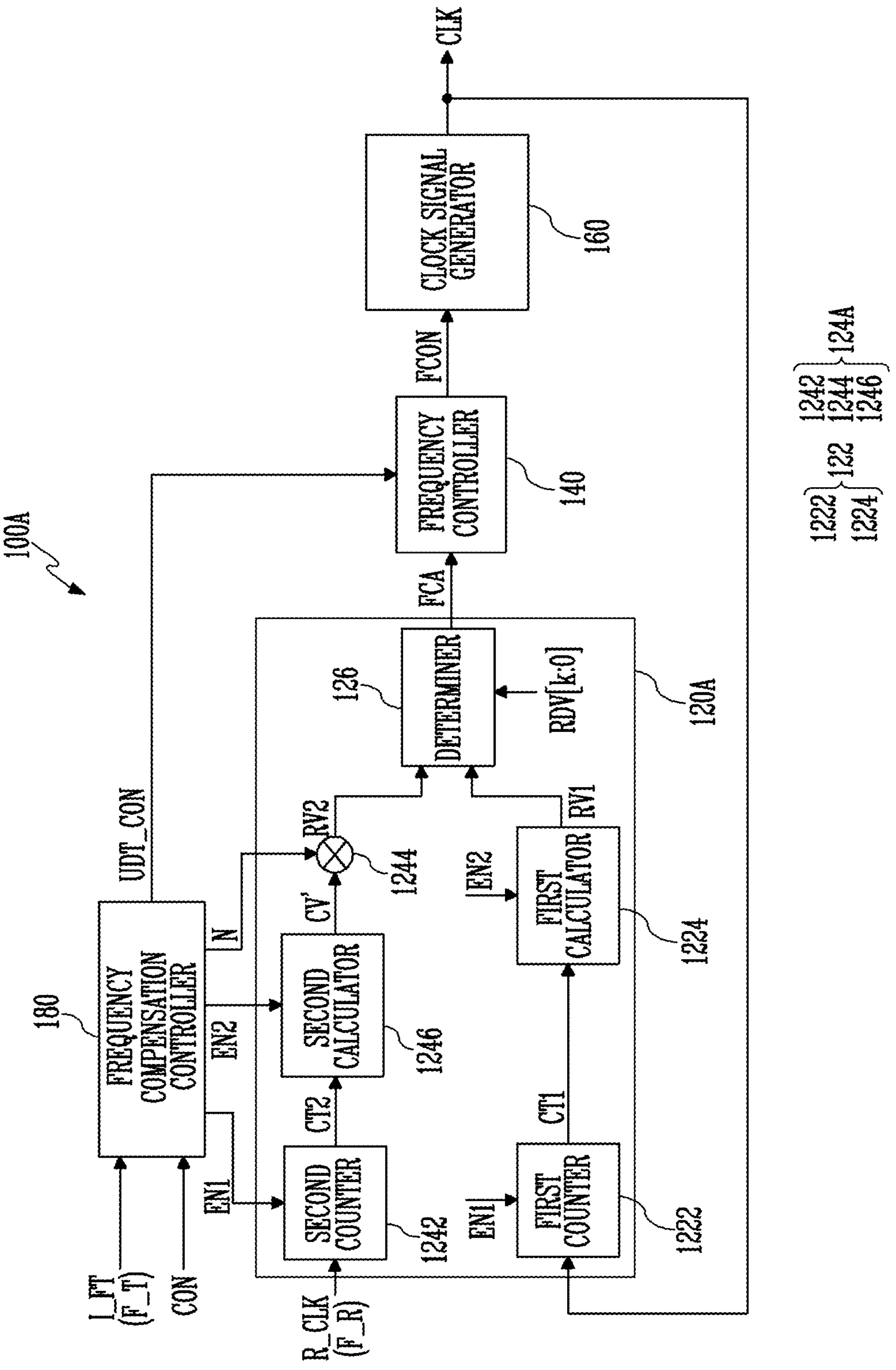
FIG. 9 is a block diagram illustrating an embodiment of the display driving circuit shown in FIG. 2.

FIG. 9 is a block diagram illustrating an embodiment of the display driving circuit shown in FIG. 2.

In FIG. 9, components identical to those described with reference to FIG. 3 are designated by like reference numerals, and their repeated descriptions will be omitted. A display driving circuit 100A shown in FIG. 9 may be identical or similar to the display driving circuit 100 shown in FIG. 3, except an arrangement of a second calculator 1246 and a multiplier 1244.

Referring to FIG. 9, the display driving circuit 100A may include a frequency variation determiner 120A, a frequency controller 140, a clock signal generator 160, and a frequency compensation controller 180.

The frequency variation determiner 120A may include a first frequency calculator 122, a second frequency calculator 124A, and a determiner 126.

In an embodiment, the second frequency calculator 124A may include a second counter 1242, the multiplier 1244, and the second calculator 1246. Unlike the embodiment shown in FIG. 3, a second count value CT2 output form the second counter 1242 may be provided to the second calculator 1246.

The second calculator 1246 may accumulate and calculate the second count value CT2 and output the accumulated and calculated second count value CT2. An output CV' of the second calculator 1246 may be provided to the multiplier 1244.

The multiplier 1244 may generate a second result RV2 by multiplying the output CV' of the second calculator 1246 and a frequency coefficient N. The second result RV2 may be substantially equal to the second result RV2 described with reference to FIG. 3.

The determiner 126 may determine a frequency variation FCA, based on a difference between a first result RV1 and the second result RV2.

Figure 10:
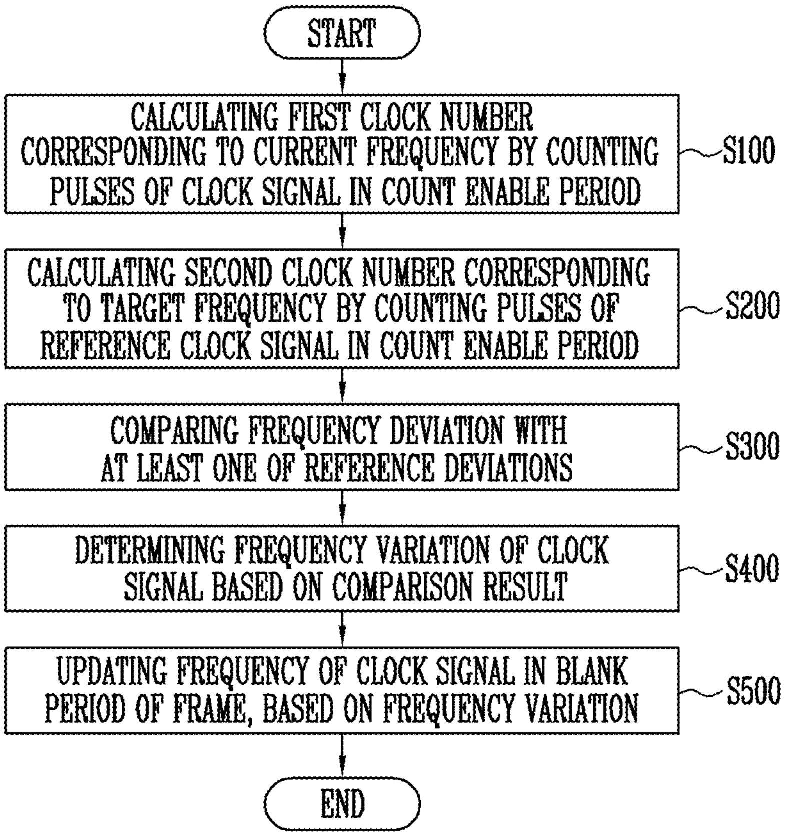
FIG. 10 is a flowchart illustrating an embodiment of a method of driving the display device in accordance with the invention.

FIG. 10 is a flowchart illustrating a method of driving the display device in accordance with the invention.

Referring to FIG. 10, the method may include calculating a first clock number corresponding to a current frequency of a clock signal by counting pulses of the clock signal in a count enable period (S100), and calculating a second clock number corresponding to a target frequency of the clock signal by counting pulses of a reference clock signal in the count enable period (S200).

Also, the method may include calculating a frequency deviation corresponding to a difference between the first clock number and the second clock number, and comparing the frequency deviation with at least one of reference deviations corresponding to predetermined reference clock numbers (S300).

A frequency variation of the clock signal may be determined based on the comparison result (S400). In the method, the frequency of the clock signal may be updated in a blank period of a predetermined frame based on the frequency variation (S500), and the clock signal may be output at the corresponding frequency. The updated frequency variation may become larger as the frequency deviation becomes larger.

The method including the operations S100 to S500 has been described in detail with reference to FIGS. 1 to 9, and therefore, any repetitive explanation concerning the above elements will be omitted.

In the display driving circuit, the display device, and the method of driving the same in accordance with the invention, a frequency variation may be adaptively adjusted according to a deviation between a current clock frequency and a target frequency. Thus, the time (e.g., the tracking time) desired to tune the clock frequency to a level of the target frequency during image display (i.e., in the display mode) may be considerably decreased. Accordingly, screen abnormality (luminance change, crosstalk, flicker, etc.) due to a change in the clock frequency during the image display may be reduced and/or minimized.

Embodiments have been disclosed herein, and although predetermined terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. An electronic device comprising:

a processor configured to generate a reference clock signal; and a frequency controller which generates a frequency control signal which updates a frequency of a clock signal, based on a frequency variation of the clock signal, wherein the frequency variation of the clock signal is determined based on the frequency of the clock signal and a target frequency derived from the reference clock signal, and wherein the frequency variation of the clock signal is decreased as a frame elapses until the frequency of the clock signal reaches the target frequency.

2. The electronic device of claim 1, wherein the frequency variation of the clock signal is determined based on a comparison result of a frequency deviation as a deviation between a current frequency of the clock signal and the target frequency and at least one of predetermined reference deviations.

3. The electronic device of claim 2, wherein a first frequency variation determined when the frequency deviation is equal to or smaller than a first reference deviation is smaller than a second frequency variation determined when the frequency deviation is greater than the first reference deviation and is equal to and smaller than a second reference deviation.

4. The electronic device of claim 1, wherein, in an image display mode, the frequency of the clock signal is changed to be close to the target frequency at a predetermined frame interval.

5. The electronic device of claim 4, wherein the decrease in the frequency variation of the clock signal is performed in a stepwise manner.

6. An electronic device comprising:

a processor configured to generate a reference clock signal; and a frequency controller which generates a frequency control signal which updates a frequency of a clock signal, based on a frequency variation of the clock signal, wherein the frequency variation of the clock signal is determined based on the frequency of the clock signal and a target frequency derived from the reference clock signal, and a first frequency change is larger thana second frequency change, which is performed after the first frequency change.

7. The electronic device of claim 6, wherein the frequency variation of the clock signal is greater in the second frequency change than in the first frequency change.

8. The electronic device of claim 6, wherein the frequency of the clock signal is closer to the target frequency in the first frequency change than in the second frequency change.

9. The electronic device of claim 6, wherein the frequency variation of the clock signal is determined based on a comparison result of a frequency deviation as a deviation between a current frequency of the clock signal and the target frequency and at least one of predetermined reference deviations.

10. The electronic device of claim 9, wherein the frequency deviation is equal to or smaller than a first reference deviation in the first frequency change, and is greater than the first reference deviation and is equal to and smaller than a second reference deviation in the second frequency change.

11. The electronic device of claim 6, wherein, in an image display mode, the frequency of the clock signal is changed to be close to the target frequency at a predetermined frame interval.

12. The electronic device of claim 11, wherein the frequency variation of the clock signal is stepwisely decreased as a frame elapses until the frequency of the clock signal reaches the target frequency.

13. An electronic device comprising:

a processor configured to generate a reference clock signal; and a frequency controller which generates a frequency control signal which updates a frequency of a clock signal, based on a frequency variation of the clock signal, wherein, in at least one frequency change, the frequency variation of the clock signal is determined based on a frequency deviation as a deviation between a current frequency of the clock signal and a target frequency derived from the reference clock signal and at least one of predetermined reference deviations, wherein the frequency variation of the clock signal is decreased as a frame elapses until the frequency of the clock signal reaches the target frequency.

14. The electronic device of claim 13, wherein a first frequency variation determined when the frequency deviation is equal to or smaller than a first reference deviation is smaller than a second frequency variation determined when the frequency deviation is greater than the first reference deviation and is equal to and smaller than a second reference deviation.

15. The electronic device of claim 13, wherein, in an image display mode, the frequency of the clock signal is changed to be close to the target frequency at a predetermined frame interval.

16. The electronic device of claim 15, wherein the decrease in the frequency variation of the clock signal is performed in a stepwise manner.

* * * * *